United States Patent Office 2,715,711
Patented Aug. 16, 1955

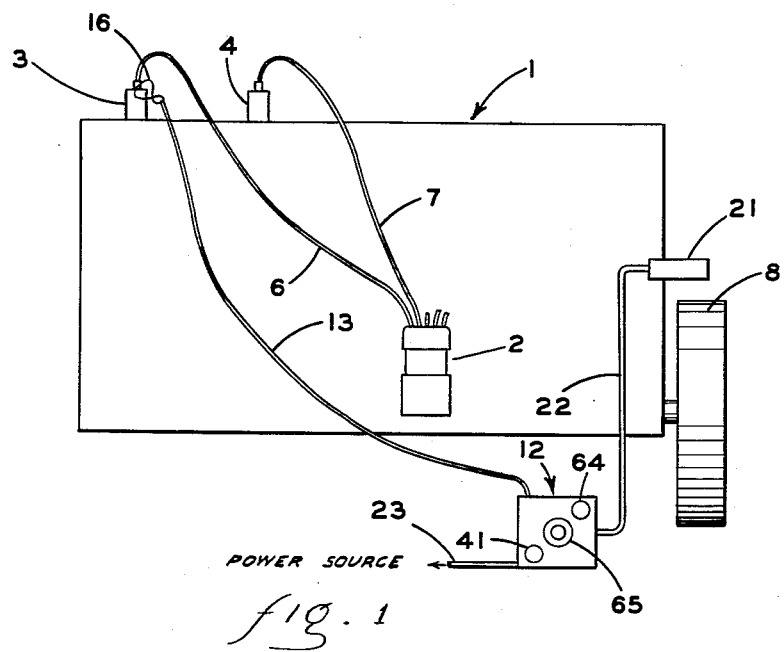
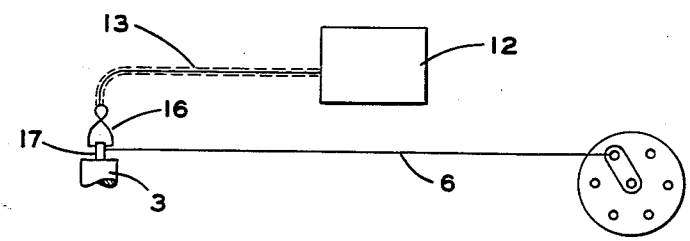
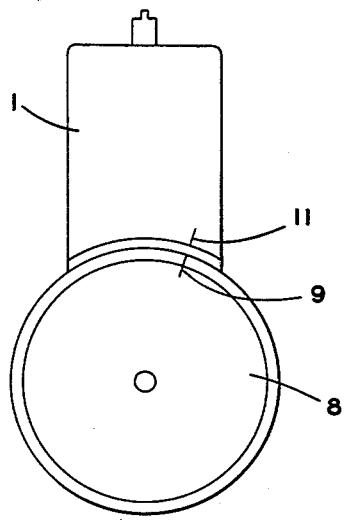

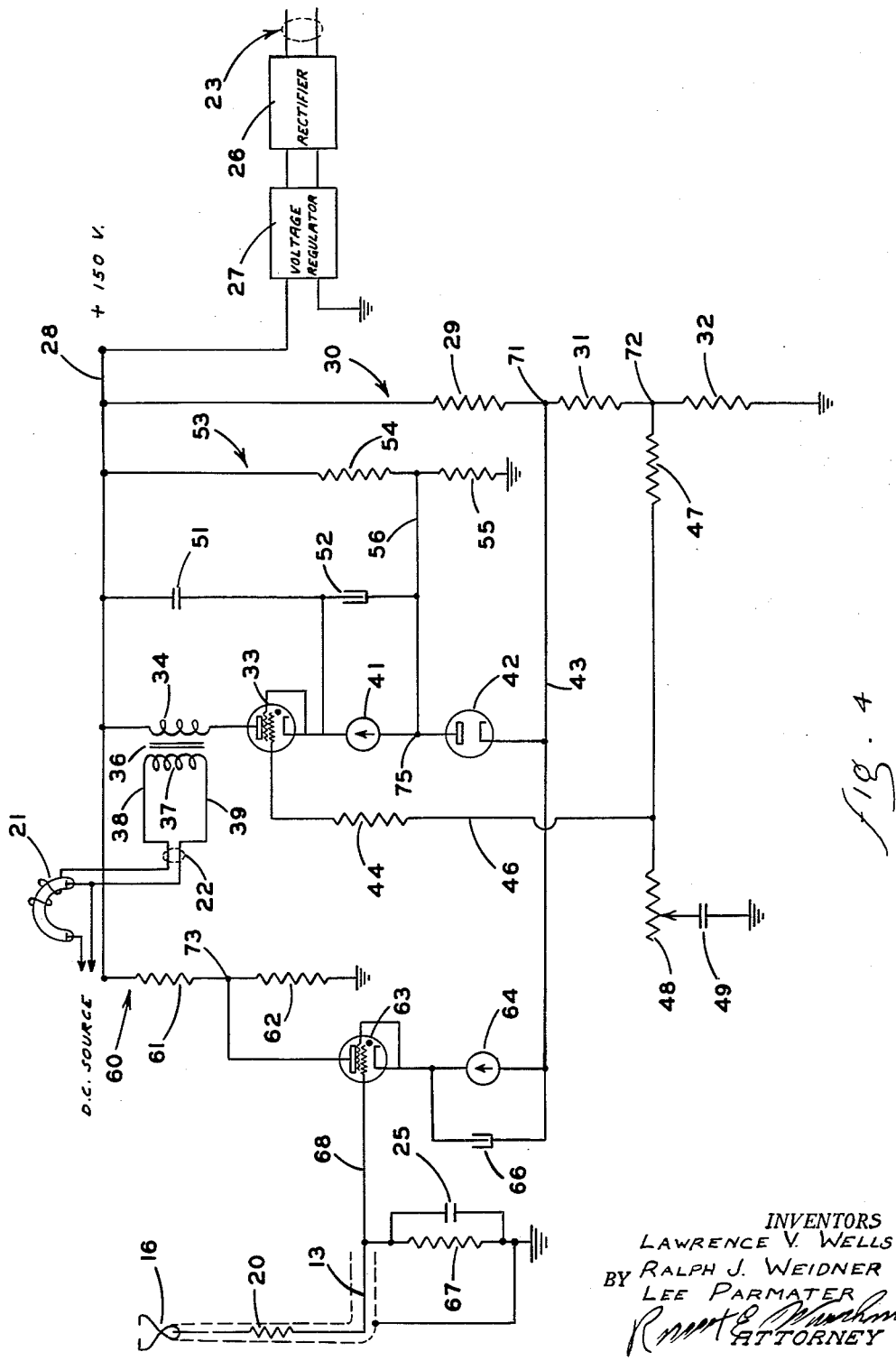

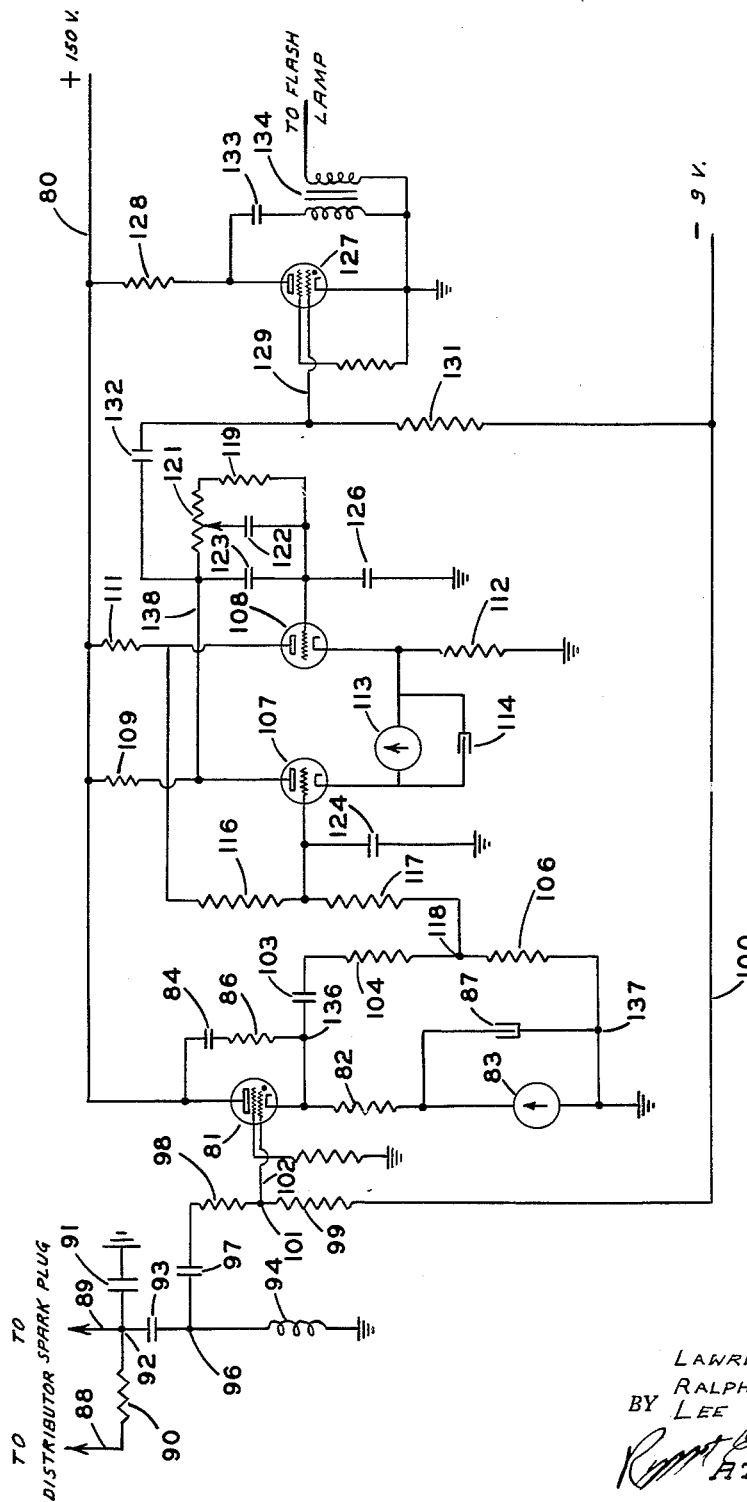

2,715,711

METHOD AND MEANS FOR CHECKING IGNITION TIMING OF AN INTERNAL COMBUSTION ENGINE

Lawrence V. Wells and Ralph J. Weidner, Kalamazoo Township, Kalamazoo County, and Lee W. Parmater, Cooper Township, Mich., assignors to Allen Electric Equipment Company, Kalamazoo, Mich., a corporation of Michigan Application December 31, 1952, Serial No. 328,978

43 Claims. (Cl. 324—16)

This application relates to a method and means for checking the ignition timing of an internal combustion engine and it particularly relates to a method and means for determining the amount of spark advance at a given engine speed and for doing so without the necessity either of removing the distributor from the engine or of making any mechanical connection to the engine.

In adjusting the ignition timing of an internal combustion engine, it is common practice to provide in a distributor automatic means for advancing the firing point of each respective cylinder ahead of the point at which a maximum amount of burning of fuel in the cylinder is desired. The degrees of advance vary according to the speed at which the engine is running in a given instance, said advance becoming greater as the engine speed increases, for reasons which are well understood in the art.

Inasmuch as the provision of accurate timing is highly essential to effective and efficient engine operation, it is necessary that adjustment of the timing be carried out accurately and that the automatic advancing of the point of ignition with increased engine speed be carried out also with a high degree of accuracy. Hence, the accurate checking of the distributor of an automobile at all ordinary engine speeds is highly important to the successful maintenance of the engine.

In present practice, it is common for this checking to be carried out by removal of the distributor from its operating position on an engine and the placing of the distributor on a special machine for the purposes of such checking, such as a machine of the type shown in U. S. Patent 2,366,889. This is usually accurate and is satisfactory from the point of view of the final result of such checking, but the requirement that the distributor be removed from the engine and placed onto a piece of special equipment is inconvenient and it becomes particularly troublesome and time consuming where it is not known with certainty whether the distributor is actually the source of the trouble for which a particular engine is being examined. Also, it frequently happens that a distributor will check accurately when in position on the checking machine, but it will still be inaccurate when in operating position on the engine. This may be due to bad bearings, a binding shaft, irregularities in the timing gears or other mechanical deficiencies in the apparatus driving the distributor. These items are often virtually impossible to locate and may cause no great damage by themselves, but they do make it practically impossible to time a distributor accurately in any condition other than in actual operating position on the engine.

It therefore is, and for a long time has been, highly desirable to provide apparatus by which the distributor can be readily and accurately checked while remaining in operating position on the engine. I am aware that certain proposals toward this same end have been made previously and that some of them appear in the patent literature but, insofar as I am aware, none of these devices has ever achieved any reasonable degree, if any, of commercial success.

Stroboscopic apparatus has previously been used for illuminating a rotating part of the engine, which carries a timing marking. Such rotating part may be the flywheel, the fan drive pulley or any other part rotating positively with the crank shaft. However, in such prior practice this has been used only to determine an initial timing, namely the timing appropriate to slow, as idling, speeds and insofar as I am aware there has been no equipment provided, stroboscopic or otherwise, suitable for automotive service station use, by which the ignition timing advance can be checked while the distributor is in operating position on the engine.

Although the necessity of advancing the firing of a spark plug appears in terms of the time required to build up maximum combustion at the point where the piston is at, or only slightly beyond, its dead center position, it has in garage practice been found more convenient to record and check such advance in terms of degrees of rotation of the crank shaft and/or of the distributor. Therefore, it is desirable to provide apparatus wherein the reading of the ignition advance may conveniently and rapidly be made in terms of degrees of rotation even though the actual control is in terms of time.

Further, since the timing markings provided for an internal combustion, especially automotive, engine are placed in a variety of positions, for service station use, where many different cars, and cars of different makes, are being examined, it is desirable that the device be usable regardless of the position of the timing markings.

Accordingly, a major object of the invention has been to provide a method and device applicable to an internal combustion engine and to the distributor thereof for checking the accuracy of the ignition timing effected by said distributor and particularly for checking the accuracy by which it automatically advances the ignition timing as engine speed increases.

A further object of the invention is to provide a method and means, as aforesaid, which require only electrical connections to the engine or to the distributor associated therewith.

A further object of the invention is to provide a method, as aforesaid, which will enable the operator to read the usual timing markings in their normal matched positions.

A further object of the invention is to provide a method, as aforesaid, which can be practiced without removing the distributor from its operating position and without making any mechanical connection with either the engine or the distributor.

A further object of the invention is to provide apparatus responsive to an electrical impulse directed by a selected pair of terminals in the distributor to a selected spark plug for energizing the triggering circuit of a flash lamp and wherein the energization of said lamp is delayed a predetermined time after the supplying of the electrical impulse to the cable of the spark plug controlled by said terminals.

A further object of the invention is to provide apparatus, as aforesaid, in which the period of such delay is readily and accurately varied by any desired amount.

A further object of the invention is to provide apparatus, as aforesaid, in which the period of the spark advance may be readily indicated in terms of degrees of either crank shaft or distributor rotation.

A further object of the invention is to provide apparatus, as aforesaid, which can be connected to a selected cable from the distributor and no further connections of any sort are required.

A further object of the invention is to provide apparatus as aforesaid, which will stroboscopically illuminate a rotating part of the engine, as the fly-wheel, and the timing mark thereon, together with the matching timing mark on the housing of the engine, and will do so at a predetermined period of time following the direction of an ignition impulse to a selected spark plug by the appropriate terminals in the distributor.

A further object of the invention is to provide apparatus, as aforesaid, of sufficient simplicity as to be capable of economical manufacture and economical maintenance.

A further object of the invention is to provide apparatus which will be sturdy and capable of long service under conditions of relatively rough usage.

A further object of the invention is to provide apparatus, as aforesaid, which can be controlled from a single dial.

A further object of the invention is to provide apparatus, as aforesaid, wherein the degrees of advance can be read from a single instrument.

A further object of the invention is to provide apparatus which can be introduced into or associated with, the electrical circuit of an ignition system without changing the operating characteristics of the internal combustion engine to which said ignition system is connected.

Other objects and purposes of the invention will be apparent to persons acquainted with apparatus of this general type upon reading of the following disclosure and inspecting the accompanying drawings.

In the drawings:

Figure 1 illustrates schematically a typical internal combustion engine including a fly-wheel and distributor associated therewith and showing the apparatus of the invention attached thereto.

Figure 2 illustrates an end view of said engine showing the timing markings on the fly-wheel and engine housing.

Figure 3 illustrates one method of connecting the apparatus of the invention to the automobile ignition system.

Figure 4 illustrates diagrammatically a circuit means for receiving energization from the distributor of an automobile and, subject to adjustable time delay, employing it to trigger a flash lamp.

Figure 5 indicates an alternate circuit for carrying out the same purposes.

In general

In general, the method of our invention consists of stroboscopically illuminating a rotating part of an internal combustion engine, such as its fly-wheel, on which is placed one of the timing markings, and simultaneously similarly illuminating the timing mark appearing on the housing adjacent said rotating part, and causing said illumination to occur at such a period of time after the firing of a selected spark plug that said timing marks will appear opposite each other. The delay so supplied to the occurrence of said illumination with respect to the firing of said spark plug will thus be equal to the spark advance actually effected by the distributor at the engine speed then being investigated, and the distributor may be adjusted if and to the extent needed.

Apparatus disclosed as a preferred embodiment herein involves a circuit energized from an external source and controlled by a selected terminal of the automobile distributor. Said circuit is energized at the same time that a selected spark plug is fired and the circuit then flashes a stroboscopic lamp, said flashing being delayed a predetermined period of time following the directing of an ignition impulse by the distributor toward said selected spark plug.

Detailed description

In setting forth a description of typical apparatus with which the invention may be used, it will be assumed that the internal combustion engine in question has its timing markings on its fly-wheel and on the part of the engine block adjacent the fly-wheel. However, it will be recognized that the apparatus of the invention will be equally applicable to those engines wherein the timing markings are on the fan drive pulley or on any other part which rotates positively with the crank shaft of the engine. It will also be assumed that the distributor rotates at one-half crank shaft speed.

Further, since the timing markings on most engines are placed with respect to the number one spark plug, the description of the present invention will be made in terms of an engine so marked, although it will be evident as the description proceeds that similar markings and analysis may be made with respect to any spark plug.

Referring to the drawings, there is shown (Figures 1, 2 and 3) a conventional internal combustion engine 1 which is provided with a distributor 2 and a plurality of conventional spark plugs of which two are indicated at 3 and 4. Conventional cables 7 and 6 lead from the respective terminals of the distributor cap to the several spark plugs. A flywheel 8 is associated with the engine in a conventional manner and carries a conventional timing marking 9. The matching timing marking 11 appears on the engine block at a suitable point adjacent said fly-wheel and indicates the position of the fly-wheel when the number one spark plug should fire at low, as idling, speeds.

The apparatus of the invention is indicated by a control box 12 having a cable 13, preferably shielded, terminating in a clip 16 adapted for engaging the spark plug terminal 17.

A flash lamp 21 is provided of the type generally indicated by United States Patent No. 2,399,222 and it is connected by a cable 22 to said control box. A power cable 23 is connected to any suitable source of electrical power, such as 115 volts alternating potential.

Turning now to a preferred circuit within the box 12 and referring particularly to Figure 4, the power cable 23 is connected to a rectifier 26 and the output of said rectifier is connected to a voltage regulator 27. The characteristics of the rectifier and the voltage regulator are such that there is supplied a substantially constant potential, such as 150 volts D. C., to the positive line conductor 28 of the apparatus. It will be recognized that any other source of substantially constant potential may be provided to energize the line conductor 28 and that the rectifier 26 and the voltage regulator 27, provided here in connection with an A. C. source, may be replaced by any convenient source of substantially steady D. C. potential.

From said positive line conductor 28 there extends a voltage divider network 30 including a relatively high resistance 29, as 270 K, a substantially lower resistor 31, as 15 K, and a still lower resistance 32, as 3.9 K. A thyratron 33 has its anode connected through the primary winding 34 of a transformer 36 to the positive line conductor 28. A secondary winding 37 of said transformer, supplies the conductors 38 and 39 which become the cable 22 for energizing the triggering circuit of the lamp 21. The principal electrodes of said lamp are energized from any convenient source, not shown and in a conventional manner. The cathode of said thyratron 33 is connected through a meter 41 and a rectifier 42 to a conductor 43. Said meter 41 is of any common current indicating type, preferably of the moving coil type, and the rectifier 42 may be of any conventional sort but is preferably a diode. One end of the conductor 43 is connected to a point 71 between the resistances 29 and 31 as shown in the drawing. The polarity of the rectifier is the same as that of the thyratron.

The grid of the thyratron 33 is connected through a protective resistance 44 to a conductor 46 which is connected through a further regulating resistance 47 to a point 72 between the resistance 31 and the resistance 32 of the voltage divider network 30. A variable resistor 48 is connected at its one end to the conductor 46 and is connected by its slider through a capacitor 49 to ground. A power capacitance 51 is connected from the cathode of the thyratron 33 to the positive line conductor 28, and a further capacitance 52 is connected around the meter 41 to steady the reading thereof.

A second voltage divider circuit 53 is connected from the positive line conductor 28 to ground and includes a relatively high resistance 54, as 1.5 megohms, and a relatively low resistance 55, as 100 K. A point between said two resistances is connected by a conductor 56 to the anode side of the diode 42.

The line conductor 28 is further connected to ground through a third voltage divider circuit 60 including a relatively low resistance 61, as 3.9 K and a relatively high resistance 62, as 18 K.

A second thyratron 63 is connected by its anode to a point 73 in the voltage divider circuit 60 between the resistances 61 and 62 and is connected by its cathode through a meter 64 to the conductor 43. A capacitor 66 is connected around the meter 64 to steady its reading. The conductor within the cable 13 is connected to ground through a resistance 67 and a conductor 68 connects a point on the cable side of said resistance 67 to the grid of the thyratron 63. A resistance 20 is located within said cable near the clip 16 and a capacitor 25 is connected around the resistance 67.

Operation

Now with reference to the operation of the apparatus, it will be appreciated as the description proceeds that the functioning is controlled by varying the potentials existing at various points throughout the system. Accordingly, for the purposes of illustration, certain specific potentials taken from a preferred embodiment will be utilized to improve the clarity of the illustration, but it should be borne in mind throughout that these specific values, as the values of certain resistances above mentioned, are for illustrative purposes only and are in no sense limiting.

Thus, with the apparatus in an "at rest" condition and with 150 volts D. C., with respect to ground, applied to the positive conductor 28, the resistances above mentioned for illustrative purposes will provide a potential at the point 71 of 9.8 volts and a potential at the point 72 of 2 volts. Similarly, the potential at the point 73 is 123 volts and the potential at the point 75 is 9.8 volts. In this condition, since the grid of the first thyratron 33 is connected to the point 72, it is materially more negative than the cathode of said thyratron and hence said thyratron is blocked. Likewise, since the grid of the thyratron 63 is connected to ground, it is materially more negative than the cathode thereof which is connected to the point 71 and hence, this thyratron is also blocked. Both thyratrons have their anodes connected to the positive line conductor 28 and hence have sufficient plate potentials to become conductive as soon as their respective grid voltages permit. Also, while the apparatus is in "at rest" condition, the capacitor 51 becomes charged from line 28.

With the energizing of spark plug 3, to which the cable 13 is connected, a triggering impulse will simultaneously be received into the system from said cable 13. A portion thereof will travel through the conductor 68 and this portion will have a positive component which will render said thyratron 63 conductive.

As soon as the thyratron 63 becomes conductive the voltage at the point 72, continuing the example above set forth, becomes 20.5 volts, at the point 71 it becomes 99.5 volts and at the point 73 it becomes 107.5 volts. At the point 75 it remains at 9.8 volts since its source in the voltage divider circuit 53 remains constant and it is uni-directionally isolated from the conductor 43 by the rectifier 42.

The increased voltage at point 72 now travels to the grid of the thyratron 33 and also into the capacitor 49 through the variable resistor 48.

As the potential at the point 72 moves in a positive direction, the potential of the grid of thyratron 33 will also move in a positive direction at a rate dependent upon the value of the capacitor 49 and upon the setting of the variable resistance 48. When the potential on said grid has moved in a positive direction to a predetermined value, the thyratron 33 will become conductive and since a plate voltage is available, said thyratron will conduct. Thus, the time between the firing of the thyratron 63 and the firing of the thyratron 33 is precisely controllable by the setting of a single element, namely, by the setting of the variable resistor 48.

The conduction of thyratron 33 serves to ionize the gas within said thyratron and thereby to permit a discharge of the capacitor 51. This discharge takes place immediately through said thyratron and thereby energizes the transformer 36 and the triggering circuit 22 of the lamp 21. The energy from the capacitor 51 is in sufficient amount to energize said triggering circuit in the usual manner.

Simultaneously, the discharge of said capacitor has the effect of impressing a reverse potential on the principal electrodes of the thyratron 33 and immediately extinguishing same. Hence, said thyratron will be extinguished simultaneously with the completion of such discharge. However, continuing the example above utilized, while said thyratron 33 was conductive the potential in the line 43, due to the virtual shorting between said conductor 43 and the positive line 28, rises to approximately 140 volts. The potential at the point 72 rises to approximately 28.9 volts and the potential at the point 73 rises to 123 volts. Thus, the potential on the cathode of the thyratron 63 is substantially more positive than that on its anode and the thyratron 63 is accordingly forthwith extinguished. Thus, with both thyratrons extinguished the system reverts to its "at rest" condition and will remain in such condition until the reception of another initiating signal from the cable 13.

The meter 41 receives pulses of current from two sources. During the brief period that the thyratron 33 is conductive, a current passes from the line conductor 28 through said thyratron, through the meter 41 and thence to ground. Also, after the capacitor 51 has discharged, and after the thyratron 33 has ceased to conduct, the recharging of the capacitor 51 will effect a brief flow of current through the meter 41. The period of current flow resulting from the conduction of the thyratron 33 is usually different, in this embodiment it is much less, in a given cycle of operation than the period of current flow resulting from charging of the capacitor 51. However, each of said periods in any given cycle are equal to corresponding periods in all other cycles and the total current flowing through said meter 41 is proportional to the frequency of energization of the initiating cable 13 and this in turn is proportional to the engine speed. Thus, the deflection of the meter 41 will be proportional to engine speed and it may be accurately calibrated as a tachometer.

Inasmuch as conduction through the thyratron 63 continues from the time at which an impulse is received from the initiating cable 13 until the said thyratron is extinguished as a result of the conduction of the thyratron 33, the ratio between its conducting time and the time of a single period between successive energizations of the cable 13, which is also equivalent to one complete rotation of the distributor, is equal to the ratio between the distributor degrees of ignition advance, and a complete rotation of said distributor. Accordingly, the meter 64 may be calibrated in degrees of advance of the distributor, or of the crankshaft if preferred, and such calibration will remain accurate for all speeds of the engine.

Thus, with the apparatus connected as shown in Figure 1, and above described, and with the engine operating in the usual manner, the period of delay between the impulse in the spark plug cable 6, and simultaneously in the triggering cable 13, and the time of flashing of the lamp 21 may be varied by adjustment of the variable resistor 48 by the dial 65. Such adjustment is made so that the timing marks 9 and 11 are caused to match in the usual manner regardless of the speed of the engine. When this is done, and bearing in mind that the normal point of matching of said timing markings assumes no ignition advance at all, it will be apparent that the delay between the time at which an impulse appears in the cable 13 and the time of flashing of the lamp will be equal to the time by which the ignition of the spark plug 3, for a given speed, precedes its point of ignition at idling speed. Thus, by calibrating the meter 64 to read directly in degrees of either distribuor or crank shaft rotation, it will be possible to read directly thereon the degrees of ignition advance for any given speed of the engine.

*Circuit of Figure 5*

Referring now to Figure 5, there is shown an alternate circuit capable of carrying out the method, and meeting the objects and purposes, set forth above.

The positive line conductor 80 is connected to any convenient source of direct potential of desired magnitude, such as 150 volts D. C. with respect to ground. It is connected to the anode of a trigger thyratron 81 whose cathode is connected through a resistance 82 and a meter 83 to ground. A capacitor 84 and a current limiting resistor 86 are connected in series with each other and around said trigger thyratron 81. A steadying condenser 87 is connected around the meter 83.

A conductor 88 connects to the distributor and the conductor 89 connects to a selected spark plug. The resistor 90 and the capacitor 91 combine to form a low pass filter to ground for reasons appearing hereinafter. The point 92 between the resistor 90 and the capacitor 91 is connected through a capacitor 93 and an inductance 94 to ground. A point 96 between said last-named capacitor and said inductance is connected through a further capacitor 97 and a voltage divider circuit including resistors 98 and 99 to a conductor 100 which is connected to a source of negative potential, as a minus 9 volts with respect to ground. The point 101 between said resistors 98 and 99 is connected by the conductor 102 to the control grid of the trigger thyratron 81. The cathode of the trigger thyratron 81 is also connected to a differentiating capacitor 103 and a voltage divider circuit, comprising the resistances 104 and 106, and thence to ground.

The vacuum tubes 107 and 108 are connected to provide a mono-stable flip-flop circuit. The vacuum tubes are each connected by their anodes through resistances 109 and 111 to the line conductor 80 to provide a source of anode potential for each thereof. Their cathodes are each connected through a suitable resistance, as resistance 112, to ground and the cathode circuit of the vacuum tube 107 also includes a meter 113. A steadying capacitor 114 is connected around said meter. The grid of the vacuum tube 107 is connected through a resistance 116 to the anode of the vacuum tube 108, and it is also connected through a further resistance 117 to a connecting point 118 between the resistances 104 and 106. The grid of the vacuum tube 108 is connected through a resistance 119 and a potentiometer 121 to the anode of the vacuum tube 107. A timing capacitor 122 is connected from the slider of the potentiometer 121 to the grid of the vacuum tube 108 and a further capacitor 123 is connected from said last-named grid around both the resistor 119 and the potentiometer 121. Further capacitors 124 and 126, of size small enough as not to prevent the operation of the flip-flop circuit, connect each of the grids of said vacuum tubes respectively to ground for the purpose of assisting to free them from the effect of the radio-frequency oscillations originating in the circuits of other spark plugs and induced in the one to which this mechanism is connected. An output thyratron 127 has its anode connected through a current limiting resistance 128 to the line conductor 80 and its cathode is connected to ground. Its control electrode is connected by a conductor 129 through a resistance 131 to the conductor 100 and said conductor 129 is also connected through a capacitor 132 to the conductor 138 leading to the anode of the vacuum tube 107. A capacitor 133 is connected in series with the primary winding of a transformer 134 and said capacitor and primary winding are connected in shunt around the thyratron 127. The secondary winding of said transformer is connected on one side to ground and the other side to the flash lamp to be energized.

Turning now to the operation of this circuit in its "at rest" condition, each of the thyratrons 81 and 127 are blocked due to the connection of their respective control grids to the negative conductor 100. The vacuum tube 108 is conductive and the vacuum tube 107 is blocked. Current flow occurring in grid to cathode conduction in the vacuum tube 108 charges the capacitors 122 and 123. The capacitors 84 and 133 are also charged from the line 80.

With the appearance of an energy pulse in the conductor 88 leading to the distributor, there is created a relatively high potential at the junction point 92 which charges the capacitor 93. When the spark plug fires, the sudden change in potential at the point 92 reacts through the capacitor 93 and on the inductance 94 to create oscillations of a predetermined frequency between said capacitor 93 and the inductance 94. The low pass filter provided by the capacitor 91 and the resistor 90 sufficiently attenuates the radio frequency impulses appearing on the conductor 88 in response to the firing of other spark plugs in the system that they will not create a triggering impulse to the control electrode of the trigger thyratron 81. However, the oscillations between the capacitor 93 and the inductance 94 are of such frequency that they will pass through the capacitor 97 and the resistance 98 and energize the conductor 102. Inasmuch as the energy appearing at the point 96 is oscillatory, a positive pulse will be received onto the conductor 102 regardless of whether the pulse received from the distributor conductor 88 is of positive or negative character.

This renders the trigger thyratron 81 conductive which permits the discharge therethrough of the capacitor 84. In addition, a flow of current is permitted to pass from the line conductor 80 through the trigger thyratron and through the meter 83 to ground. This, together with the flow of current through the meter 83 during the subsequent recharging of the capacitor 84, effects an energization of the meter which will be the same with each of the currents, corresponding to those just described, of the subsequent cycles, and which in turn will be proportionate to the frequency of firing of said selected spark plug. Hence, the meter 83 may be readily and accurately calibrated as a tachometer.

The flow of current through the resistance 82 and the meter 83 also places a potential between the connecting points 136 and 137 and this tends to cause a flow of current through the circuit including the resistance 104 and 106. The valve of capacitor 103 is chosen so as to make the potential appearing at the connecting point 118 the first derivative of the potential in the resistance 82 rather than a replica thereof. This serves to make the impulse appearing at the point 118, and consequently upon the grid of the vacuum tube 107, of even steeper characteristics in both its build up and its decay than that of the pulse passing through the resistance 82.

The sharp pulse of positive voltage appearing on the control electrode of the vacuum tube 107 will permit conduction therethrough. Said conduction will, in the usual manner in a flip-flop circuit, effect a sufficient change of potential in a negative direction on the grid of the vacuum tube 108 to provide in substance a negative potential on said grid with respect to the cathode of said vacuum tube, whereby to effect blocking of said last-named vacuum tube. The capacitors 123 and 122 will then hold a blocking potential on the grid of the vacuum tube 108 for a period of time determined by the time required for the charge of said last-named capacitors to drain out through the resistances 119 and 121, said time being adjustable by adjustment of said potentiometer 121. Thus, current flows through the meter 113 for as long as the tube 107 is conductive which is as long as the tube 108 is blocked. As the negative charge in the capacitors 122 and 123 diminishes and the potential on the grid of the tube 108 moves in a positive direction, the tube 108 will presently become conductive and this will render the tube 107 non-conductive. When the vacuum tube 107 thus becomes non-conductive, the potential in the conductor 138 again moves in a positive direction and directs a pulse through a capacitor 132 and on the conductor 129 to the control grid of thyratron 127. This renders this thyratron conductive and permits a discharge therethrough of the capacitor 133. The discharge of said capacitor creates a pulse through the transformer 134 which then energizes the triggering circuit of the flash lamp in the usual manner.

The conductivity of the vacuum tube 107, and therefore the energizing of the meter 113, will be equal to the time between the firing of the thyratron 81 and the firing of the thyratron 127, and therefore equal to the time delay between the firing of the spark plug and the illuminating of the flash lamp, and the meter 113 will indicate such delay. Inasmuch as the thyratron 81 will fire once for every other revolution of the engine shaft, the meter 113 may be calibrated in degrees and will, therefore, indicate directly in degrees the amount of ignition advance when the timing markings, illuminated by the flash lamp appear to coincide with each other. In this respect, it will be recognized that the operation embodying the circuit of Figure 5 is the same as that of the device embodying the circuit of Figure 4.

Thus, a method, and apparatus by which said method may be practiced, has been set forth for carrying out the objects and purposes above outlined.

It will be also recognized, in view of the foregoing, that the method and apparatus above set forth will be found applicable to a number of other uses and problems, involving the illumination of a flash lamp at a predetermined period of time, whether or not adjustable, following the occurrence of an electrical event. For example, with the mechanism still triggered from the ignition system, the lamp might be used to illuminate valve or valve operating mechanism of an internal combustion engine and the time delay function would indicate the angular relationship between a given valve position and the supplying of potential to a given spark plug. Similarly, it might be used to indicate in aircraft engines the angular relationship between a given propeller position and the occurrence of a given electrical impulse. Other related uses will be apparent to those skilled in the art.

While the method as above set forth, has been illustrated with particular apparatus, and said apparatus has been illustrated with particular embodiments thereof, it will be apparent that the invention with respect to both method and apparatus may be varied in a number of its details at the choice of persons skilled in the art and such variations will be obvious to such persons. Accordingly, the hereinafter appended claims will be given such interpretation as will include such variations excepting as said claims may by their own terms expressly require otherwise.

We claim:

1. In a method for checking the ignition timing adjustment of an internal combustion engine, which method includes stroboscopically illuminating the normal timing marks of said engine and the lamp effecting said illuminating being energized in response to energization of a cable leading from the distributor to a selected spark plug, the steps including: delaying the energization of said lamp with respect to the energization of said cable a period of time equal to the actual time of ignition advance and utilizing said period of time delay to indicate the amount of ignition advance.

2. In a method for checking the ignition timing adjustment of an internal combustion engine, which method includes stroboscopically illuminating an externally visible rotating member of said engine, said rotating member and the housing adjacent thereto bearing indicia bearing a predetermined relationship with each other at the point of zero ignition advance, the lamp effecting said illuminating being energized in response to energization of the cable normally leading from the distributor to a selected spark plug, the step: delaying the energization of said lamp with respect to the energiaztion of said cable such a period of time that said indicia will attain a predetermined relationship with each other.

3. In a method for checking the ignition timing adjustment of an internal combustion engine, which method includes stroboscopically illuminating a rotating member of said engine, said rotating member and the housing adjacent thereto bearing indicia bearing a predetermined relationship with each other at the point of zero ignition advance, the lamp effecting said illuminating being energized in response to energization of a cable leading from the distributor to a selected spark plug, the steps including: delaying the energization of said lamp with respect to the energization of said cable such a period of time that said indicia will assume a predetermined relationship with respect to each other and utilizing said period of time delay to indicate the actual amount of ignition advance.

4. In apparatus for checking the timing adjustment of the distributor of an internal combustion engine, the combination: a lamp; circuit means for energizing same, said circuit means being connectible to a source of power; means energizing said circuit in response to the creation of an energizing impulse for a selected spark plug; said circuit means including time delay means energizing said lamp a predetermined period of time following said energizing of said circuit; an indicator energized for a time period proportional to said predetermined period of time delay in the energization of said lamp by said circuit and providing an indication of the ratio of said predetermined period of time delay with respect to the duration of the engine cycle in which said predetermined period of time delay occurs.

5. In apparatus for stroboscopically illuminating a selected part of an internal combustion engine, the combination: a lamp; circuit means for energizing same, said circuit means being connectible to a source of power; means energizing said circuit in response to the creation of a regularly repeating electrical impulse related to the operation of said engine; said circuit means including time delay means energizing said lamp a predetermined period of time following each occurrence of said energizing of said circuit; an indicator energized for time periods proportional to said predetermined periods of time delay in the energization of said lamp following each occurrence of said energizing of said circuit and providing indication of the ratio of each of said several predetermined periods of time with respect to the duration of each cycle in which said predetermined periods of time respectively occur.

6. In apparatus for checking the timing adjustment of the distributor of an internal combustion engine, the combination: a lamp having a starting electrode; a triggering circuit means for energizing said starting electrode and connectible to a source of power; means energizing said triggering circuit in response to the creation of an energizing impulse for a selected spark plug; said triggering circuit means including time delay means energizing said starting electrode a predetermined period of time following each occurrence of said energizing of said triggering circuit.

7. In apparatus for checking the timing adjustment of the distributor of an internal combustion engine, the combination: a lamp having a starting electrode; a triggering circuit means for energizing said starting electrode and connectible to a source of power; means repeatedly and successively energizing said triggering circuit in response to the repeated and successive creation of energizing impulses for a selected spark plug; said triggering circuit means including time delay means energizing said starting electrode a predetermined period of time following each time of energizing of said triggering circuit, a meter responsive to the frequency of occurrence of said energizing impulse.

8. In apparatus for checking the timing adjustment of the distributor of an internal combustion engine, the combination: a lamp having a starting electrode; a triggering circuit means for energizing said starting electrode and connectible to a source of power; means repeatedly and successively energizing said triggering circuit in response to the repeated and successive creation of energizing impulses for a selected spark plug; said triggering circuit means including time delay means energizing said starting electrode a predetermined period of time following each time of energizing of said triggering circuit, a meter responsive to the frequency of occurrence of said energizing impulse; an indicator providing substantially a steady integrated reading proportional to the ratio of said several predetermined periods of time with respect to the duration of each cycle in which said predetermined periods of time occur.

9. An apparatus for checking the ignition timing of an internal combustion engine including a distributor, comprising in combination: a lamp; circuit means connectible to a source of power for energizing said lamp; initiating means responsive to the energization of a selected electrode of the distributor for energizing said lamp, said means effecting said energization a predetermined period of time following each occurrence of the energization of said electrode, an indicator indicating the ratio of each of said several predetermined periods of time with respect to the duration of each cycle in which said predetermined periods of time respectively occur.

10. In apparatus for stroboscopically illuminating a selected mechanical member, the combination: a lamp; circuit means for energizing same, said circuit means being connectible to a source of power; means energizing said circuit in response to the creation of a regularly repeating electrical impulse; said circuit means including time delay means energizing said lamp a predetermined period of time following each occurrence of said energizing of said circuit, an indicator energized for time periods proportion to said predetermined periods of time delay in the energization of said lamp following each occurrence of said energizing of said circuit and providing indication of the ratio of each of said several predetermined periods of time with respect to the duration of each cycle in which said predetermined periods of time respectively occur.

11. An apparatus for checking the ignition timing of an internal combustion engine, including a distributor, comprising in combination: a flash lamp; circuit means connectible to a source of power for energizing said flash lamp; initiating means, including a power capacitor, responsive to the energization of a selected electrode of the distributor for initiating the said circuit means having energizing of said flash lamp, said initiating means effecting said energization by discharging said capacitor at a predetermined period of time following the energization of said electrodes, an indicator energized for a time period proportional to said predetermined period of time and providing indication of the ratio of said predetermined period of time with respect to the duration of the cycle in which said predetermined period of time occurs.

12. An apparatus for checking the ignition timing of an internal combustion engine, including a distributor, comprising in combination: a flash lamp; circuit means connectible to a source of power for energizing said flash lamp; initiating means, including a power capacitor, responsive to the energization of a selected electrode of the distributor for initiating the energizing of said flash lamp, said initiating means effecting said energization by discharging said capacitor at a predetermined period of time following each occurrence of the energization of said electrode; an indicator providing substantially steady integrated reading proportional to the ratio of each of said several predetermined periods of time with respect to the duration of each cycle in which said predetermined periods of time respectively occur.

13. An apparatus for checking the ignition timing of an internal combustion engine including a distributor, comprising in combination: a lamp; circuit means connectible to a source of power for energizing said lamp; said circuit means including a power capacitor and being responsive to the energization of a selected electrode of the distributor for supplying energizing power to said lamp; said circuit means including a thyratron and means rendering same conductive at a predetermined period of time following each occurrence of the energization of said electrode for effecting said supplying of power by discharging said capacitor through said thyratron.

14. An apparatus for checking the ignition timing of an internal combustion engine including a distributor, comprising in combination: a flash lamp; a source of potential; circuit means connectible to said source of power for energizing said flash lamp, said circuit means including a power capacitor connected to said source and further connected for energizing said lamp, a thyratron connected in series with the discharge path of said capacitor and also connected for being normally non-conductive, a second thyratron also connectible to said source of potential and likewise normally non-conductive, a conductor responsive to the energization of a predetermined electrode of said distributor for rendering said second thyratron conductive and means responsive to conduction of said second thyratron after the elapsing of a predetermined period of time from the conduction of said second thyratron for rendering said first thyratron conductive.

15. The combination described in claim 14 including also a current responsive meter calibrated as a tachometer and positioned in series with said first thyratron.

16. Apparatus for checking the ignition timing of an internal combustion engine including a distributor, comprising in combination: a flash lamp having a starting electrode and an energizing circuit for same; a source of substantially constant potential; circuit means connectible to said source of potential for energizing said flash lamp and a trigger circuit for energizing said starting electrode, said trigger circuit means including a power capacitor connected to said source and further connected for energizing the starting electrode of said lamp, a thyratron connected in series with the discharge path of said capacitor and also connected for being normally non-conductive, a second thyratron also connectible to said source of substantially constant potential and likewise normally non-conductive, a conductor responsive to the energization of a predetermined electrode of said distributor for rendering said second thyratron conductive and means responsive to conduction of said second thyratron after the elapsing of a predetermined period of time from the conduction of said second thyratron for rendering said first thyratron conductive; a meter responsive to the frequency of occurrence of said energization of said distributor; an indicator providing a substantially steady integrated reading proportional to the ratio of said predetermined period of time with respect to the duration of the cycle in which said predetermined period of time occurs.

17. Apparatus for checking the ignition timing of an internal combustion engine including a distributor, comprising in combination: a flash lamp and a starting circuit for same; a source of potential; circuit means connectible to said source of potential for energizing said flash lamp, said circuit means including a power capacitor connected to said source and further connected for energizing said lamp, a first thyratron connected in series in the discharge circuit of said capacitor and also connected for being normally non-conductive, a second thyratron also connected to said source of potential and likewise normally non-conductive, a conductor responsive to the energization of a predetermined electrode of said distributor for rendering said second thyratron conductive and means responsive to conduction of said second thyratron after the elapsing of a predetermined period of time from the action of said second thyratron for rendering said first thyratron conductive; said circuit being further connected for reducing the plate voltage on said second thyratron upon conduction of said first thyratron to a point below that at which said second thyratron will maintain conduction, whereby conduction of said second thyratron will effect conduction of said first thyratron and thereby effect a discharge of said capacitor and consequent energization of the starting circuit of said lamp.

18. The combination described in claim 17 including also a current responsive meter calibrated as a tachometer and positioned in series with said first thyratron.

19. Apparatus for checking the ignition timing of an internal combustion engine including a distributor, comprising in combination: a flash lamp having a starting electrode and an energizing circuit for same; a source of substantially constant potential; circuit means connectible to said source of potential for energizing said flash lamp and a trigger circuit for energizing said starting electrode, said trigger circuit means including a power capacitor connected to said source and further connected for energizing the starting electrode of said lamp, a thyratron connected in series with the discharge path of said capacitor and also connected for being normally non-conductive, a second thyratron also connectible to said source of substantially constant potential and likewise normally non-conductive, a conductor responsive to the energization of a predetermined electrode of said distributor for rendering said second thyratron conductive and means responsive to conduction of said second thyratron after the elapsing of a predetermined period of time from the conduction of said second thyratron for rendering said first thyratron conductive.

20. An apparatus for checking the ignition timing of an internal combustion engine including a distributor, comprising in combination; a source of constant potential; a flash lamp having a starting circuit; a power capacitor connected to said source; a first thyratron; a transformer, the secondary winding of said transformer being connected to the starting circuit of said flash lamp; means connecting said thyratron in series in the primary winding of said transformer and in closed circuit through said primary winding with said power capacitor; a first voltage divider network having a relatively large first resistance between said source and a first point thereon, a smaller second resistance between said first point and a second point thereon and a still smaller resistance between said second point and ground; a second voltage divider network having a relatively small resistance between said source of constant potential and a connecting point thereon and a relatively high resistance between said connecting point and ground; means connecting the anode of said thyratron to said source and the cathode to said first point; a circuit including a second thyratron connecting said connecting point and said first point, the anode of said second thyratron being connected to said connecting point and the cathode thereof being connected to said first point; the anode of said first thyratron being connected to the positive side of said constant source, the cathode of said first thyratron being connected to said first point and the grid of said first thyratron being connected to said second point; said grid being also connected through a timing capacitor to a point of fixed potential.

21. The combination described in claim 20 including a variable resistance in series between the grid of the first thyratron and said timing capacitor.

22. The combination described in claim 20 including also a rectifier interposed in the cathode circuit of said first thyratron and arranged in the same polarity as that of said first thyratron and a second source of substantially constant potential connected to said cathode at a point between said cathode and said rectifier.

23. The combination described in claim 20 including also a current responsive meter calibrated as a tachometer and positioned in series with said first thyratron.

24. In a method for checking the ignition timing adjustment of an internal combustion engine, which method includes stroboscopically illuminating the normal timing marks of said engine and the lamp effecting said illuminating being energized in response to each energization of a cable leading from the distributor to a selected spark plug, the steps including: delaying said respective energizations of said lamp with respect to each energization of said cable a period of time equal to the actual time of ignition advance and utilizing said period of time delay to indicate the amount of ignition advance.

25. In apparatus for checking the timing adjustment of the distributor of an internal combustion engine, the combination: a lamp; a circuit for energizing same; means energizing said circuit in response to the creation of an energizing impulse for a selected spark plug; said circuit including time delay means energizing said lamp a predetermined period of time following each occurrence of said energizing of said circuit, an indicator energized for periods of time proportional to the predetermined periods of time delay in the energization of said lamp following each occurrence of said energizing of said circuit and providing indication of the ratio of each of several predetermined periods of time with respect to the duration of each cycle in which said predetermined periods of time respectively occur.

26. A method for checking the ignition timing adjustment of an internal combustion engine, comprising the steps: stroboscopically illuminating the timing marks of said engine in such timed relationship thereto when the ignition thereof is in a condition of no advanve that said timing marks appear in a selected relationship with respect to each other; accelerating said engine to a selected test speed and proportionately increasing the frequency of flashing of the source of said illuminating; delaying the occurrence of said flashing with respect to the rotation of said engine without diminishing the frequency of said flashing until the timing marks again appear in said selected relationship to each other; measuring the degrees of rotation between the angular position of a rotating part of the engine at the instant of illumination of said source prior to said delaying and the angular position of the same part of the engine at the instant of illuminating of said source after such delaying; and utilizing the number of such degrees to determine the ignition advance at said test speed.

27. A method for checking the ignition timing adjustment of an internal combustion engine, comprising the steps: utilizing the ignition of a selected spark plug of said engine for stroboscopically illuminating the timing marks of said engine when the ignition thereof is in the condition of no advance, said timing marks being so arranged that when so illuminated they will appear in a selected relationship with respect to each other; accelerating said engine to a selected test speed and proportionately increasing the frequency of flashing of said illuminating; retarding the illumination of the stroboscopic lamp with respect to the attainment of a selected position by said rotating part of said engine but without altering the frequency of flashing of said lamp until the timing marks again appear in said selected relationship to each other, measuring the degrees of rotation between the angular position of a rotating part of the engine at the instant of illumination of said source prior to said retarding and the angular position of the same part of the engine at the instant of illuminating of said source after such retarding; and utilizing the number of such degrees to determine the ignition advance at said test speed.

28. In a method for checking the ignition timing adjustment of an internal combustion engine, comprising the steps: stroboscopically illuminating the timing marks of said engine in such timed relationship thereto when the ignition thereof is in a condition of no advance that said timing marks appear in a selected relationship with respect to each other; accelerating said engine to a selected test speed and simultaneously and proportionately increasing the speed of flashing of the source of said illuminating; delaying the illumination of said source with respect to the rotation of said engine without diminishing the frequency of said illumination until the timing marks again appear in said selected relationship to each other; measuring the time required for a selected rotating part of the engine to move from the angular position occupied at the instant of flashing of the lamp prior to said retarding and the angular position of said part at the instant of flashing after said retarding and utilizing said time to determine the ignition advance at said test speed.

29. A method for checking the ignition timing adjustment of an internal combustion engine, said engine having externally visible timing marks associated with a rotatable part thereof, comprising the steps: stroboscopically illuminating said timing marks in such timed relationship to the rotation of the engine when the ignition thereof is in a condition of reference advance that said timing marks appear in a selected relationship with respect to each other; changing the speed of said engine to a selected test speed and proportionately changing the frequency of flashing of the source of said illuminating; altering the time of occurrence of said flashing with respect to the rotation of said engine without diminishing the frequency of said flashing until the timing marks again appear in said selected relationship to each other; measuring the degrees of rotation between the angular position of a rotating part of the engine at the instant of illumination of said source prior to said altering and the angular position of the same part of the engine at the instant of illuminating of said source after such altering; and utilizing the number of such degrees to determine the ignition advance at said test speed.

30. In a method for checking the ignition timing adjustment of an internal combustion engine, said engine having externally visible timing marks associated with a rotatable part thereof, the steps: stroboscopically illuminating said timing marks in such timed relationship to the rotation of the engine when the ignition of said engine is in a condition of reference advance adjustment that said timing marks appear in a selected relationship with respect to each other; changing a condition of engine operation to change the amount of the ignition advance and maintaining the flashing of the stroboscopic illumination proportional to the speed of said rotatable part of said engine; altering the time of occurrence of said flashing with respect to the rotation of said engine without changing the frequency of said flashing until the timing marks again appear in said selected relationship to each other; measuring the degrees of rotation between the angular position of a rotating part of the engine at the instant of illumination of said source prior to said altering and the angular position of the same part of the engine at the instant of illuminating of said source after such altering; and utilizing the number of such degrees to determine the ignition advance under said changed condition of engine operation.

31. In a method for checking the ignition timing adjustment of an internal combustion engine, said engine having externally visible timing marks associated with a rotatable part thereof, the steps: stroboscopically illuminating said timing marks in such timed relationship to the rotation of the engine when the ignition of said engine is in a condition of reference advance adjustment that said timing marks appear in a selected relationship with respect to each other; changing a condition of engine operation to automatically change the amount of ignition advance and maintaining the flashing of the stroboscopic illumination proportional to the speed of a rotating part of said engine; altering the time of occurrence of said flashing with respect to the rotation of said engine without changing the frequency of said flashing until the timing marks appear in a selected relationship to each other; measuring the time required for a selected rotating part of the engine to move from the angular position occupied by it at the instant of flashing of the lamp prior to said altering and the angular position occupied by said rotating part of the engine at the instant of flashing of said lamp after said altering and utilizing said time to determine the ignition advance under said changed condition of engine operation.

32. In apparatus for checking the timing adjustment of the distributor of an internal combustion engine, the combination: a lamp having a starting electrode; a triggering circuit means for energizing said starting electrode and connectible to a source of power; means repeatedly and successively energizing said triggering circuit in response to the repeated and successive creation of energizing impulses for a selected spark plug; and triggering circuit means including time delay means energizing said starting electrode a predetermined period of time following each time of energizing of said triggering circuit; an indicator indicating the ratio of each of said several predetermined periods of time with respect to the duration of each cycle in which the predetermined periods of time respectively occur.

33. In apparatus for checking the timing adjustment of the distributor of an internal combustion engine, the combination: a lamp; a triggering circuit for energizing said lamp and connectible to a source of power; means repeatedly and successively energizing said triggering circuit in response to the repeated and successive creation of energizing impulses for a selected spark plug; said triggering circuit means including time delay means energizing said lamp a predetermined period of time following each respective time of energizing of said triggering circuit, an indicator indicating the ratio of each of said several predetermined periods of time with respect to the duration of each cycle in which said predetermined periods of time respectively occur.

34. Apparatus for checking the ignition timing of an internal combustion engine including a distributor, comprising in combination: a flash lamp having a starting electrode and an energizing circuit for same; a source of substantially constant potential; circuit means connectible to said source of potential for energizing said flash lamp and a trigger circuit for energizing said starting electrode, said trigger circuit means including a power capacitor connected to said source and further connected for energizing the starting electrode of said lamp, a thyratron connected in series with the discharge path of said capacitor and also connected for being normally non-conductive, a second thyratron also connectible to said source of substantially constant potential and likewise normally non-conductive, a conductor responsive to the energization of a predetermined electrode of said distributor for rendering said second thyratron conductive and means responsive to conduction of said second thyratron after the elapsing of a predetermined period of time from the conduction of said second thyratron for rendering said first thyratron conductive; an indicator providing a substantially steady integrated reading proportional to the ratio of said predetermined period of time with respect to the duration of the cycle in which said predetermined period of time occurs.

35. In apparatus for checking the ignition timing adjustment of an internal combustion engine, said engine having externally visible timing marks associated with a rotatable part thereof, the combination comprising: stroboscopic means for illuminating said timing marks in such timed relation to the rotation of the engine when the ignition of said engine is in condition of reference advance adjustment that said timing marks appear in a selected relationship with respect to each other; means for maintaining the flashing of said stroboscopic means proportional to the speed of said rotatable part of said engine; means for altering the time of energization of said stroboscopic means with respect to the rotation of said engine but without changing the frequency of said flashing with respect to the speed of rotation of said engine until the timing marks again appear in said selected relationship to each other; means indicating the degrees of rotation between the angular position of the rotating part of the engine at the instant of illumination of said source prior to said altering and the angular position of the same part of the engine at the instant of illuminating said source after such altering.

36. An apparatus for checking the ignition timing of an internal combustion engine including a distributor, comprising in combination: a lamp; circuit means connectible to a source of power; said circuit means including a power capacitor responsive to the energization of a selected electrode of the distributor for supplying energizing power to said lamp; means including an electric discharge device and means rendering same conductive at a predetermined period of time following each occurrence of the energization of said electrode for effecting said supplying of power by discharging said capacitor through said electric discharge device.

37. An apparatus for checking the ignition timing of an internal combustion engine including a distributor, comprising the combination: a lamp; circuit means connectible to a source of power; said circuit means including a power capacitor responsive to the energization of a selected electrode of the distributor for supplying energizing power to said lamp; means including a circuit and means rendering same conductive at a predetermined period of time following each occurrence of the energization of said electrode for effecting said supplying of power by discharging said capacitor through said circuit.

38. An apparatus for checking the ignition timing of an internal combustion engine having a distributor, comprising in combination: a flash lamp; circuit means connectible to a source of potential and including a power capacitor, said power capacitor being connected for energizing said lamp; a first circuit connected in series with the discharge path of said capacitor and also connected for being normally non-conductive, a second circuit also connectible to said source of potential and likewise normally non-conductive, a conductor responsive to the energization of a predetermined electrode of said distributor for rendering said second circuit conductive and means responsive to conduction of said second circuit after the elapsing of a predetermined period of time from the conduction of said second circuit for rendering said first circuit conductive.

39. Apparatus for checking the ignition timing of an internal combustion engine including a distributor, comprising in combination: a flash lamp and an energizing circuit for same; circuit means connectible to a source of substantially constant potential and including a power capacitor connected to said source and further connected for energizing said lamp, a thyratron connected in series with the discharge path of said capacitor and also connected for being normally non-conductive; a further circuit also connectible to said source of substantially constant potential and likewise normally non-conductive, a conductor responsive to the energization of a selected electrode of said distributor for rendering said further circuit conductive and means responsive to conduction of said further circuit after the elapsing of a predetermined period of time from the conduction of said further circuit for rendering said thyratron conductive.

40. An apparatus for checking the ignition advance of an internal combustion engine having a distributor, comprising in combination: a flash lamp; circuit means connectible to a source of potential and including a power capacitor, said power capacitor being connected for energizing said lamp; a first circuit connected in series with the discharge path of said capacitor and also connected for being normally non-conductive, a second circuit also connectible to said source of potential and likewise normally non-conductive, a conductor responsive to the energization of a predetermined electrode of said distributor for rendering said second circuit conductive and means responsive to conduction of said second circuit after the elapsing of a measurable period of time from the conduction of said second circuit for rendering said first circuit conductive; and an indicator utilizing said period of time for indicating the value of said ignition advance.

41. In a method for checking the ignition timing adjustment of an internal combustion engine, said engine having externally visible timing marks associated with a rotatable part thereof, the steps: stroboscopically illuminating said timing marks in such timed relationship to the rotation of the engine when the ignition of said engine is in a condition of reference advance adjustment and said timing marks appear in a selected relationship with respect to each other; changing a condition of engine operation to automatically change the amount of ignition advance and maintaining the frequency of flashing of the stroboscopic illumination proportional to the speed of a rotating part of said engine; altering the time of occurrence of said flashing with respect to the rotation of said engine, and doing so without changing the frequency of said flashing with respect to the speed of rotation of said engine, by an amount sufficient that said marks will assume a predetermined relationship with respect to each other and utilizing the amount of said altering to indicate the actual amount of ignition advance under the changed condition of engine operation.

42. In apparatus for checking the timing adjustment of a distributor of an internal combustion engine, the combination: a lamp; a circuit for energizing said lamp and connectible to a source of power; means energizing said circuit in response to the creation of an energizing impulse for a selected spark plug, said circuit including time delay means for effecting energization of said lamp a predetermined period of time following each occurrence of said energizing of said circuit; and an indicator indicating the ratio of each of said predetermined periods of time with respect to the duration of each cycle in which said predetermined periods of time respectively occur.

43. In apparatus for checking the timing adjustment of a distributor of an internal combustion engine, the combination: a lamp; a circuit for energizing said lamp and connectible to a source of power; means energizing said circuit in response to the creation of an energizing impulse for a selected spark plug, said circuit including time delay means energizing said lamp a measurable period of time following each occurrence of said energizing of said circuit and an indicator utilizing said period of time delay to indicate the actual amount of ignition advance.

References Cited in the file of this patent

UNITED STATES PATENTS

| 2,073,247 | Miller | Mar. 9, 1937 |
| 2,344,037 | Fuller | Mar. 14, 1944 |
| 2,366,889 | Westberg et al. | Jan. 9, 1945 |
| 2,458,974 | Bauer | Jan. 11, 1949 |
| 2,467,732 | Davis | Apr. 19, 1949 |
| 2,492,247 | Weaving et al. | Dec. 27, 1949 |
| 2,571,959 | Smith | Oct. 16, 1951 |
| 2,614,240 | Bivens | Oct. 14, 1952 |